US008483446B2

(12) United States Patent
Demarais et al.

(10) Patent No.: US 8,483,446 B2
(45) Date of Patent: Jul. 9, 2013

(54) METHOD AND SYSTEM FOR ESTIMATING ANTLER, HORN, AND PRONGHORN SIZE OF AN ANIMAL

(75) Inventors: Stephen Demarais, Starkville, MS (US); Bronson K. Strickland, Starkville, MS (US); Jeremy Flinn, LaGrange, KY (US); Stephen L. Webb, Laramie, WY (US)

(73) Assignee: Mississippi State University, Mississippi State, MS (US)

( * ) Notice: Subject to any disclaimer, the term of this patent is extended or adjusted under 35 U.S.C. 154(b) by 145 days.

(21) Appl. No.: 13/134,850

(22) Filed: Jun. 17, 2011

(65) Prior Publication Data

US 2011/0311109 A1    Dec. 22, 2011

Related U.S. Application Data

(60) Provisional application No. 61/397,892, filed on Jun. 17, 2010.

(51) Int. Cl.
*G06K 9/00* (2006.01)
*A01K 1/03* (2006.01)

(52) U.S. Cl.
USPC ............................................ 382/110; 119/421

(58) Field of Classification Search
USPC .................. 382/110, 203; 348/89, 135, 140, 348/143; 119/53.5, 54, 421, 452, 51.04, 52.3, 119/57.9, 59, 666
See application file for complete search history.

(56) References Cited

U.S. PATENT DOCUMENTS 7,711,151 B2 *   5/2010   Jurk .............................. 382/110

* cited by examiner

*Primary Examiner* — Abolfazl Tabatabai
(74) *Attorney, Agent, or Firm* — Lawrence Arthur Schemmel (57) ABSTRACT

The present invention is directed to a method and system utilizing novel computer software for determining the antler, horn, and pronghorn size of an animal by calculating, measuring, analyzing, comparing, scoring, presenting, and comparing the antler and horn sizes of animals such as deer, bovids, and pronghorns from digital data and/or photographs.

68 Claims, 2 Drawing Sheets

METHOD AND SYSTEM FOR ESTIMATING ANTLER, HORN, AND PRONGHORN SIZE OF AN ANIMAL

CROSS-REFERENCE TO RELATED APPLICATION

This application claims priority from U.S. Provisional Patent Application Ser. No. 61/397,892 filed Jun. 17, 2010. The entirety of that provisional application is incorporated herein by reference.

STATEMENT OF GOVERNMENT SUPPORT

This invention was made with government support under 14-5029-0-2-303 and 1448-40181-02-G-066 awarded by the U.S. Department of the Interior, Fish and Wildlife Service. The government may have certain rights in the invention.

FIELD OF THE INVENTION

This invention relates to the field of computer software and more specifically to the field of a computer software method and system for calculating, measuring, analyzing, comparing, scoring, and displaying or presenting the antler, horn, and pronghorn size of animals, specifically deer, moose, elk, and the like.

BACKGROUND OF THE INVENTION

In 2003, the inventors began working on technology that would measure white-tailed deer antlers using photographic images. Ultimately, a new software application was developed that would provide very accurate three-dimensional estimates of antlers and horns and provide a scoring system for comparison to other antlered and horned animals.

Hirakawa and Maeda described the use of bat wing measurements to scale photographs taken by automated cameras at a presentation at the 8th International Theriological Congress in 2001. Subsequently, these same authors published this methodology in a 2006 issue of the Wildlife Society Bulletin.

Similar technologies have also been published that determine physical characteristics of unrestrained animals. For example, Kelly (2001) imported photographic images of cheetahs into a graphical user interface (GUI) to take measurements of animal physical characteristics from one or more images. Kelly (2001) made measurements on the photographic images to quantify the physical characteristics of animals.

The present invention in a preferred embodiment is distinctive from prior art methods and systems. U.S. Pat. No. 7,711,151 (Jurk) provides for a system and method for determining physical characteristics of an unrestrained animal, describes a process of capturing and displaying images of an animal which is not unique, and has an undocumented level of accuracy. Capturing and loading animal images into a computer and displaying the images on a GUI has been used by the trail camera industry at least since the 1990's for viewing photos and analyzing animals (Thomas 2010) and in wildlife research to quantify antler characteristics of individual animals in a process that estimated population characteristics (Jacobson, et al. 1997; Heilbrun, et al. 2003). The known process of capturing, viewing, and manipulating photographic images of animals in a computer GUI has been used for quite some time (Kelly 2001, Hastings, et al. 2001, Thomas 2010). The present invention provides a system and method to transform measurements from an image into numerical estimates of absolute antler and horn size of deer and other animals. The invention produces a realistic, accurate three-dimensional estimate of antler and horn characteristics by statistically manipulating two-dimensional measurements taken from photographic images and scoring the characteristics for comparison.

The system of the present invention utilizes a unique set of anatomical features and process for scaling pictures. For example, according to the American Heritage Dictionary, a nostril is "either of the external openings of the nose," indicating that typically one would scale a photo using a single opening that runs laterally up the side of an animal's snout. Moreover, the system of the present invention utilizes geographic region-specific anatomical values for scaling pictures across the species' ranges, such as the white-tailed deer range. The invention takes into account the fact that anatomical features and age of large mammals such as deer vary significantly among the $\geq 16$ subspecies of white-tailed deer across the North American range (Baker 1984, Demarais, et al. 2000, Flinn 2010). The software of the present invention considers both spatial- and age-specific user input to correctly scale an image and transforms two-dimensional measurement estimates derived from two-dimensional (2D) photographs into three-dimensional (3D) measurement estimates of animal antlers, horns, and pronghorns internally using a set of statistically-derived equations. The invention is capable of using a single image or multiple images and provides extremely accurate analysis of antler, horn, and pronghorn size and a method for scoring these features and many other applications.

There is a growing need and demand by animal scientists, wildlife biologists and managers, and animal enthusiasts for a novel, efficient, and accurate system to estimate animal antler, horn, and pronghorn characteristics and the present invention provides such a system through software that calculates three-dimensional estimates of animal antlers, horns, and pronghorns and an animal scoring system using one, two, or three angle views of the animal.

SUMMARY OF THE INVENTION

The present invention provides for a novel method and system utilizing computer software for calculating, measuring, analyzing, comparing, scoring, and displaying antler and horn sizes of animals, such as deer, bovids, and pronghorns, from digital data and/or photographs.

Estimating antler and horn size of animals is a skill desired by many deer and hunting enthusiasts. A trail camera is a common scouting tool that generates pictures of male deer and other animals with unknown antler or horn size. Estimating antler and horn size from pictures can generally hone a hunter's field estimating skills and improve selective harvesting decisions. The present invention also allows collection and analysis of data from electronic images and/or pictures as part of a herd monitoring program or research project. The software method and system of the present invention allows users to estimate, measure, compare, and display antler and horn characteristics, depending on the specific animal, such as inside spread, two main beam lengths, at least one tine length on each antler of the animal, one to four circumferences on each antler, and applicable abnormal points, and a gross antler or horn score, from electronic images and/or photographs. The program of the present invention uses a unique set of anatomical features and statistically-derived, correction equations to achieve extremely accurate estimates of animal antler and horn characteristics.

Figure 1:
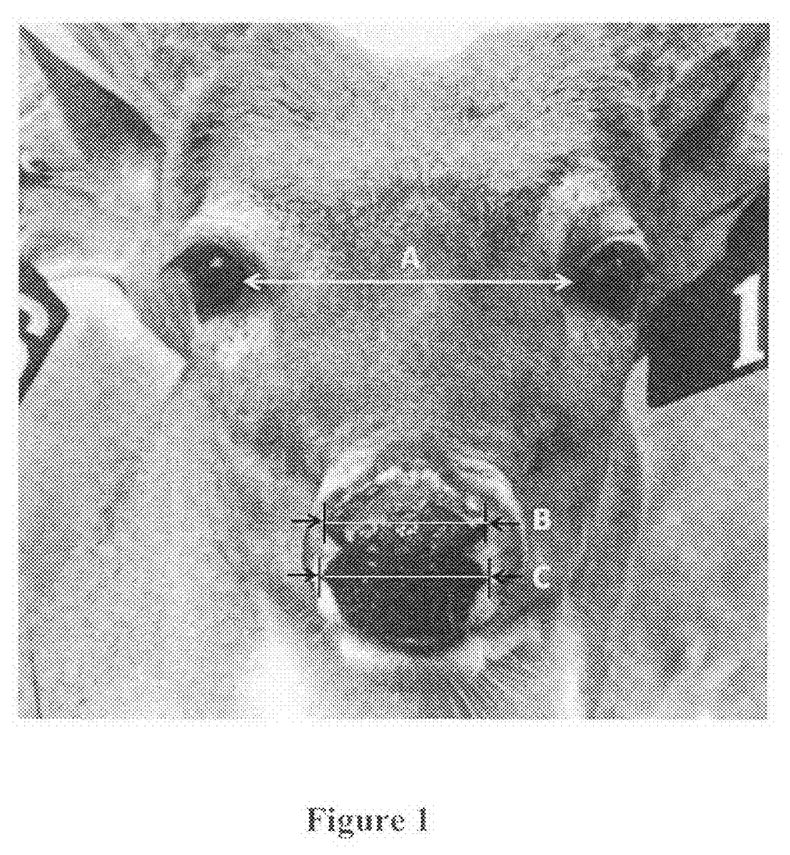
FIG. 1 is a pictorial illustration of three anatomical measurements (eye-to-eye width, upper nasal planum width, and lower nasal planum width) that were collected by individuals skilled in the art from hunter-harvested and pen-raised deer throughout the white-tailed deer range.

The following is a summary of the present invention:
1. The method and system scales, measures, transforms, calculates, and estimates image data to determine and estimate the three-dimensional antler, horn, and pronghorn size of animals based on predictive equations that transform two-dimensional measurements made on a scaled, digital, photographic image into three-dimensional estimates.
2. A reference collection of at least 100 taxidermy-mounted specimens is used for each particular species of deer and bovid. The ≧100 mounted specimens represent the normal variation in size of specimens for each particular species of deer and bovid (e.g., below average, average, and above average animal specimens are needed to develop and validate predictive equations that represent the size variation within a species of animal). For each mount, trained professionals use Boone and Crockett Club measuring guidelines (Nesbitt and Wright 2003) or equivalent methods to determine measurements of individual features that make up the gross, non-typical score of deer or the gross score of bovids. These measurements serve as the "known" or "reference measurements" that are used to develop and validate statistical equations to transform two-dimensional measurements from digital images to the corrected three-dimensional estimate.
3. The invention improves the animal orientation in photographs. The orientation of the animal relative to the camera lens is critical for accurate size estimation, so photographs of the mounted specimens are taken from three angles: for example, straight-on (0°), angled (45°), and side (90°). A known-size spherical object is included in each photograph.
4. The invention establishes spatial scale within each photograph of mounted specimens by geo-referencing the known-size spherical object via software. Geo-referencing is the process of scaling some object in space so that other objects of unknown size can be measured. For the invention, the geo-referencing process incorporates the known-size object through X- and Y-coordinates and scales other objects in the photograph accordingly.
5. The invention transforms two-dimensional photos into three-dimensional measurements. Antlers or horns are measured in photographs of 75% of the sample of mounted specimens using geo-referencing software and Boone and Crockett Club measuring guidelines. Curvature and depth perception are not accounted for in the initial measurements of the two-dimensional photographs. Using the reference measurements (which are three-dimensional measurements) and the two-dimensional measurements collected from the photos, the invention uses novel regression equations to predict three-dimensional measurements at each angle (0°, 45°, 90°) from the two-dimensional measurements. Each of the three-dimensional antler or horn features is modeled as the dependent variable in a regression equation and the two-dimensional value generated from the photograph is modeled as the independent variable. Once these equations are developed, a three-dimensional measurement can be estimated from the corresponding two-dimensional measurement.
6. The invention accounts for individual measurements that are not visible in a photograph. If an antler or horn feature (e.g., tine or circumference) is hidden by other parts of the antler or horn (e.g., main beams), the invention uses the measurement from the equivalent feature on the opposing antler or horn because antlers and horns tend to be symmetrical.
7. Predictive equations are evaluated for accuracy by comparing reference measurements from the remaining 25% of known-size, mounted antlers or horns to the measurements estimated by the regression equations. Accuracy of specific features typically varies by angle of photograph. The invention determines which angle most accurately estimates each of the features (e.g., for antlers, features include inside spread, main beam lengths, tine lengths, circumferences, and abnormal points). When measuring an animal using multiple images, the invention uses the best available angle to estimate each specific feature. The invention calculates average accuracy for each view using a single photograph and for two and three photographs at different angles (e.g. use of both 0° and 45° photographs or use of 0°, 45°, and 90° photographs of the same animal).
8. Predictive equations are further evaluated for accuracy at the approximate angles of 0°, 45°, and 90° using either sedated live animals or harvested animals that were photographed while alive. A trained professional uses Boone and Crockett Club guidelines to determine reference measurements for the gross, non-typical score of each set of antlers or gross score of each set of horns on the sedated animal or the harvested animal. The invention measures the appropriate features of each antler or horn in photographs of the animal (taken while it was un-sedated and live). The accuracy of the predictive equations for use with live animals is evaluated by comparing the reference measurements to measurements estimated by the regression equations.
9. The invention collects average values of anatomical features for use in geo-referencing digital photographs and includes obtaining a sample of precise measurements from at least 10 males of each age class within each region and subspecies. Precise measurements are taken using a digital caliper or equivalent. Digital photographs of live animals are geo-referenced or scaled. The digital photographic image is geo-referenced using anatomical features representative of the average size of that feature for the species or subspecies in the particular physiographic region where the deer or bovid was photographed. Anatomical features of deer and bovids vary in size by sex and age, along latitudinal gradients, by subspecies, and by physiographic region. Thus, any anatomical feature used to geo-reference a photograph must use average values applicable to the specific area from which the animal was photographed.
10. Appropriate anatomical features vary with the angle of orientation of the photographed animal (FIG. 1). From the side view (90 degrees), the anatomical features include eyeball width (the diameter of the eyeball, not the entire socket) and ear width (the widest part of the ear perpendicular to the axis). From the 45 degree view, the anatomical features include eyeball width and ear width. From the frontal view (0 degrees), the anatomical features include eyeball-to-eyeball width (measured from the right pre-orbital gland to the left pre-orbital gland), ear width, upper nostril width, and lower nostril width.
11. The invention sums appropriate estimated three-dimensional measurements for the species or subspecies of deer, bovid, or pronghorns to calculate the gross, non-typical score of each set of antlers or gross score of each set of horns.

With the foregoing and other objects, features, and advantages of the present invention that will become apparent hereinafter, the nature of the invention may be more clearly understood by reference to the following detailed description of the preferred embodiments of the invention and to the appended claims.

BRIEF DESCRIPTION OF THE DRAWINGS

These drawings accompany the detailed description of the invention and are intended to illustrate further the invention and its advantages. The drawings, which are incorporated in and form a portion of the specification, illustrate certain preferred embodiments of the invention and, together with the entire specification, are meant to explain preferred embodiments of the present invention to those skilled in the art.

DETAILED DESCRIPTION OF THE INVENTION

The present invention provides for a novel method and system for determining the antler, horn, and pronghorn size of an animal by utilizing computer software. Moreover, it provides a software means for scoring and comparing antler and horn size with data from multiple sources. The invention utilizes a computer-based device to obtain the invention's accurate results.

Introduction

Data collection of free-ranging wildlife that is both accurate and cost-effective benefits wildlife researchers and managers. Remotely-triggered cameras (RTCs) have been used successfully to estimate white-tailed deer density and sex ratio (Jacobson, et al. 1997; McKinley, et al. 2006; Roberts, et al. 2006) and accurate antler and horn size estimation using the present invention would provide additional valuable data. Bergeron (2007) measured alpine ibex (Capra ibex) horns accurately (within 3.9% of mean length) using RTC photographs, suggesting that the collection of antler morphometric data from photographs is feasible. Antler data collection currently is limited to harvested animals, with potential sample composition bias due to antler-based harvest restrictions and hunter selection (Coe, et al. 1980). Additionally, the widespread use of antler-based harvest restrictions, such as minimum beam length, has created a need for an educational tool for hunters (Strickland, et al. 2001). Remotely-triggered camera photographs of bucks provide less-biased, non-lethal samples of antler characteristics for biologists and researchers and an educational opportunity for hunters.

Three issues must be addressed to accurately estimate antler or horn size from a photograph. First, the photograph must be scaled to obtain meaningful measurements. Next, predictive equations must be constructed to transform a two-dimensional measurement from a photograph into a three-dimensional estimate. Finally, predictive equations are needed at different angles because antler and horn orientation affects the three-dimensional estimation.

The goal of the research for the present invention was to evaluate the ability to accurately estimate white-tailed deer antler size from photographs. Predictive equations were constructed using measurements of mounted, known-score antlers with a known-size scale reference to obtain three-dimensional estimates from a two-dimensional photograph. Equations were constructed to be applicable at three orientations to the camera lens. Accuracy of the predictive equations was determined using a subsequent set of mounted, known-score antlers with a known-size scale reference in the photograph, and with images of live, male white-tailed deer. The inventors created an online and a stand-alone antler scoring software program to obtain accurate antler estimates whereby users can upload digital photographs and estimate features including inside spread, main beam length, and a gross antler score.

Methods

Development

The inventors obtained photographs of antlers with known scores from the Magnolia Records Program (MRP) of the Mississippi Department of Wildlife, Fisheries, and Parks. A trained professional used Boone and Crockett Club guidelines to determine the gross, non-typical score of each mounted set of antlers (i.e., first reference measurements) (Wright and Nesbitt, 2003). A unique ID number assigned to each mount identified the scorer, the scoring session, and the date. The unique ID was used to match the deer's antler measurements and final gross non-typical B&C to the mount's photographs. Two-hundred (200) mounted sets of antlers were photographed at three (3) different angle views from the camera lens: straight-on frontal (0°), angled (45°), and side (90°). The first reference measurements are based upon analyzed animal specimens (known score and mounted) that are photographs of animals representing a normal size variation for each species.

A scale was established within each photograph by geo-referencing each picture using a known-size spherical object in ArcGIS 9.2 (ESRI, Inc. 2006). Georeferencing is defining an object's existence in space. For the present invention, geo-referencing relates the antlers or horns of the deer or animal to the known-size, scale reference in the photograph (ESRI, Inc. 2006). The known-size reference was a ball with either a 44.45- or 57.15-mm diameter.

Methodology was developed to transform two-dimensional measurements into three-dimensional estimates. The inventors measured antlers of one-hundred fifty (150) of the two-hundred (200) mounted deer photographs using the ArcGIS software with Boone and Crockett Club antler scoring guidelines (Wright and Nesbitt 2003). Curvature and lack of depth perception were not accounted for in the initial measurements of the two-dimensional photographs. A regression equation (SAS Institute 2004) was developed for each antler characteristic at each of the three angles. Occasionally, tines or circumferences were hidden by other parts of the antler (e.g., main beams). In these cases, the measurement from the equivalent feature on the other antler was used since antlers tend to be symmetrical after about 1½ years of age (Demarais and Strickland 2011).

Predictive regression equations were evaluated on a subsequent set of known-score, mounted antlers (n=50). Average accuracy was calculated for each view using a single photograph and for two or three photographs at different angles (e.g. use of both 0° and 45° view photographs or use of 0°, 45°, and 90° view photographs of the same deer). Accuracy of specific antler characteristics typically varies by angle. The inventors determined which angle best estimated the major antler characteristics (inside spread, two main beam lengths, tine lengths, circumferences, and abnormal points, or a combination of two or more thereof) based on the results using a single photograph. When using multiple images, the best available angle to estimate that specific antler characteristic is pre-determined internally in the program of the invention based on single photo accuracy.

Inside spread value at the 90° view was not estimated using an adjustment equation incorporating actual and GIS values due to the total lack of spread differentiation. Therefore, a separate adjustment equation was developed for this situation using the relationship between the main beam lengths and the inside spread. The inventors constructed the adjustment equation using photographs of 150 known-score, mounted antlers at the 90° view.

Program Development

To create the user-friendly software program of the present invention, the inventors had their methodology translated into computer software code to enable operation of the program on the internet or a computer-based device. A user uploads a photograph of an antlered buck or horned animal and selects the appropriate orientation and region of origin. The user then scales the photograph by identifying the extremities of one or more of several anatomical features. Region-specific average values for these attributes are accessed within the software program. After the user measures each antler characteristic on the two-dimensional photograph, the value is transformed into a three-dimensional estimate using the predictive regression equations of the invention. A report is generated listing the estimated inside spread, main beam length, and gross antler score from a single photograph.

To increase accuracy, another embodiment of the present invention is a stand-alone software package which operates on a personal computer. The software allows the user to upload photographs of the same deer at up to three different angles of orientation. When using multiple photographs, the best available orientation to most accurately estimate each antler or horn characteristic is pre-determined by the program of the invention.

Field Evaluation

The inventors evaluated program accuracy for estimating antler characteristics of photographed, live, known-score deer from Mississippi and Oklahoma (i.e., second reference measurements). Deer were photographed at each of the three angles which were approximate because the antler orientation of live deer was uncontrollable. A trained professional used Boone and Crockett Club guidelines to determine the gross, non-typical score (Nesbitt and Wright, 2003) for Mississippi (sedated) and Oklahoma (harvested) deer. The second reference measurements are based upon analyzed live animal specimens (known score) that are photographs of live animals.

Figure 2:
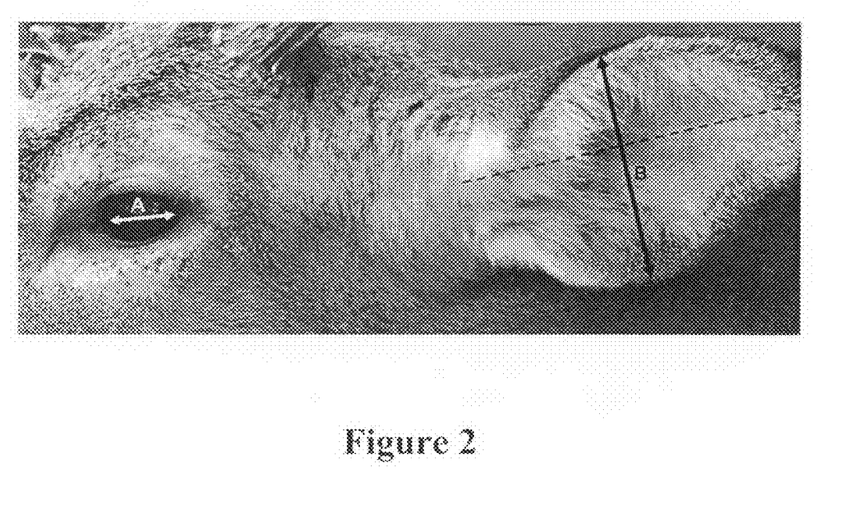
FIG. 2 is a pictorial illustration of two anatomical measurements (eyeball width and ear width) that were collected by individuals skilled in the art from hunter-harvested and pen-raised deer throughout the white-tailed deer range.

Anatomical features must be used as scale references because known-size objects are not available within photographs of live deer. The inventors sampled five (5) anatomical features of sedated and harvested deer in Mississippi and Oklahoma, respectively (FIG. 1 and FIG. 2). FIG. 1 shows a pictorial illustration of three anatomical feature measurements as follows: (A) eye-to-eye width; (b) upper nasal planum width; and (C) lower nasal planum width. These measurements were collected from hunter-harvested and pen-raised white-tail deer throughout the white-tailed deer range to provide scale references for the present invention. FIG. 2 shows a pictorial illustration of two anatomical feature measurements as follows: (A) eyeball width (soft eyeball tissue); and (2) ear width. These measurements were collected from hunter-harvested and pen-raised deer throughout the white-tailed deer range to provide morphometric scale references for the present invention.

As shown in FIG. 1, using a frontal view of the deer's head (0° angle to the camera lens), with both eyes clearly visible in the picture, the eye-to-eye width measurement is taken as the distance between the interior edge of one eyeball (the location of the pre-orbital gland) to the interior edge of the opposing eyeball. Upper nasal planum width was measured at the widest part of the nasal planum (e.g., in a typically pigmented deer this is the black, hairless tissue immediately above the nostrils). Lower nasal planum width was measured at the widest point of the nasal planum perpendicular to the philtrum (e.g., in a typically pigmented deer this is the black, hairless tissue immediately below the nostrils). As shown in FIG. 2, eyeball width was measured as the diameter of the actual eyeball, not the entire socket. Additionally, ear width was measured at the widest part of the ear perpendicular to the long axis.

The inventors compared anatomical features among ages and between deer in Mississippi and Oklahoma using a two-way analysis of variance (SAS Institute 2004) and determined whether age class affects anatomical measurements $\geq 1.5$ years of age. If age class affected the measurements, deer were grouped as needed (e.g., 1.5-2.5 years and $\geq 3.5$ years). Age was known for the research deer and was estimated for the hunter-harvested deer using tooth replacement and wear techniques (Severinghaus, 1949). If regional differences occurred, then separate sets of anatomical features were used for each region. State/region specific mean values were calculated (SAS Institute 2004) for each of the five (5) measurements.

The inventors evaluated the program of the invention on a set of known-score, live deer and considered these deer the test subjects to evaluate the accuracy of the method in "normal" (wild deer) conditions. Estimated accuracy was calculated based on angle and anatomical features. As with the MRP stage, accuracy was calculated for one photograph at each orientation and for all combinations of two and three photographs at each orientation.

Results

Development

Photographs of 150 mounted antlers were used to construct predictive regression equations of the invention. Mean antler values included: gross antler score 329.9 cm (129⅞ inches), with a range of 73.3 cm to 507.4 cm (28⅞ to 199⅝ inches); inside spread 40.6 cm (16⅝ inches), with a range of 9.2 cm to 62.9 cm (3⅝ to 24⅝ inches); and main beam length 52.4 cm (20⅝ inches), with a range of 12.4 cm to 69.9 cm (4⅞ to 27⅜ inches). Fifty-nine (59) out of 150 mounted deer (39%) had one or more abnormal (non-typical) points.

Ninety-seven (97) predictive equations were developed using the measurements from the photographed mounted antlers. All predictive equations required to estimate antler characteristics were significant statistically. Coefficient of determination ($R^2$) values varied from 0.97 for total length of abnormal points at 0° view and 90° view to 0.61 for inside spread at the 45° view. The 0° view best accounted for variation in inside spread ($R^2=0.94$). The 90° view best accounted for main beam length ($R^2=0.85$). The 45° view best accounted for total tine length variation ($R^2=0.96$). The 0° view best accounted for total circumference variation ($R^2=0.88$).

Accuracy of estimating three-dimensional antler measurements for mounted antlers varied by orientation (Table 1). For example, inside spread was best estimated at 0° view (5.0% mean error rate), and main beam length was best estimated at the 45° view (6.3% mean error rate).

When using a single photograph, the 45° view generated the most accurate estimation of gross score for mounted antlers (3.2% mean error rate), with loss of accuracy at 0° view (Table 1). Gross antler score could not be calculated using a single photograph at the 90° view because inside spread could not be measured. Using two photographs and combining the best estimates from the 45° view and 90° view orientations improved gross antler score estimation accuracy by decreasing mean error rate to 2.9% (Table 2). Using three photographs and combining the best estimates from each angle improved gross antler score estimation accuracy by decreasing mean error rate to 2.5% (Table 2).

Field Evaluation

Five (5) anatomical measurements collected from 243 adult (≧1.5 years old) male white-tailed deer from Mississippi (n=203) and Oklahoma (n=40) varied with age (P<0.050). In Mississippi deer, eyeball width was approximately 6% larger and upper nasal planum width was about 14% larger at ≧2 years than at 1 year (P<0.001). Eye-to-eye width and eyeball width were about 10% smaller in Mississippi deer than in Oklahoma deer (P<0.001).

Accuracy of antler measurement estimates of live deer using a single photograph varied by angle and anatomical scaling feature (Tables 1-3). Using ear width as the scaling feature provided the most consistently accurate results (Table 3). Ear width produced the lowest error rate of 4.9% for gross score for the 0° view (Tables 1-2). Using the second best anatomical feature, eyeball width, produced 6.0% mean error for gross antler score at the 45° and 90° views.

The inventors developed a user-friendly GUI using computer software code for users to upload digital photographs and estimate inside antler spread, left and right main beam length, left and right antler main beam circumferences, typical and non-typical antler tine lengths, and a gross antler score, similar to Boone and Crockett non-typical gross score (Wright and Nesbitt 2003).

Discussion

Generating accurate estimates of gross antler score and specific antler characteristics from a photograph is now feasible using the mathematical and statistical methodology of the method and system of the present invention. The statistically-derived, predictive equations transform unique two-dimensional measurements into accurate, three-dimensional estimates. Previous studies have successfully measured bats and Alpine ibex using photographs. Bergeron (2007) estimated the length of annuli on ibex horns within 2 mm of the hand-measured value on 93% of samples. Fixed-positioned lasers had to be visible on the horns at the time of the photograph, limiting the approach. Hirakawa and Maeda (2001, 2006) evaluated accuracy when using the shadows of bats to calculate bat body size. Their approach used the distance from the wingtip of a bat to the ground as a reference to calculate the distance of the bat to the camera. They concluded that the technique varied in accuracy, but produced an unbiased size estimate (Hirakawa and Maeda 2006).

The wide range of antler sizes used to construct the predictive equations of the present invention allows broad application of the software and method and system of the present invention. Accuracy may vary for antlers outside the 434 cm (170⅞ inch) range used in the development of the predictive equations.

Several sources of error in estimating antler size from photographs may exist. These sources typically include variation in anatomical features, variation in antler orientation to the camera lens, number of photographed orientations used, photograph resolution, and user error. Accuracy of the estimates from mounted, known-score antlers involves the least amount of error (only user variation) and is considered "best case" accuracy.

Anatomical features vary at two scales, individually and regionally. Average values of anatomical features must be used to scale a photograph, but the actual value for an individual photographed deer is unknown. The difference between the average and an individual's anatomical feature values is a source of error in the estimate. White-tailed deer vary by geographic region (Gill 1956; Richie 1970; Strickland and Demarais 2000; Millien, et al. 2006) and body size will likely affect the size of anatomical features. The invention considers species, subspecies, geographic region, and gender and age of the animal. Variation in eyeball and eye-to-eye width between Mississippi and Oklahoma deer indicates that values must be determined across the geographic range of white-tailed deer. To estimate antler size with even greater accuracy, measurements collected by individuals skilled in the art from twenty-two (22) additional state and provincial agencies (Table 4) are available for users of the program software of the invention for scoring antler and horn sizes.

Accuracy of antler and horn characteristic estimates varies by angle of orientation of the image. The inventors developed the predictive equations of the invention at specific angles to the camera lens to improve accuracy of the estimates.

The decreased accuracy of estimating gross antler and horn score for live deer and other animals compared to mounted antlers or horns with a fixed spherical object as a reference can be attributed to individual variation of anatomical features among animals and orientation of antlers and horns in photographs. Similarly, Hirakawa and Maeda (2006) determined that the accuracy of estimates varied among photographs based on position of a bat relative to the camera lens. Choosing to use only photographs of live deer or animals which were at the exact angle would have diminished the sample size substantially. This limitation can be minimized by using multiple photographs of the same deer or animal at different orientations, which for the present invention decreased mean error rate from 5.9% for one photograph to 4.3% for two photographs.

Inside spread and main beam length are two antler characteristics that are becoming widely used as selective harvest criteria (Strickland, et al. 2001). Previously, the ability to visually estimate antler or horn size was considered an art more than a science. The method and system of the present invention provides two extremely useful tools for the avid deer enthusiast: the first is a hunter education tool to train the user's ability to recognize specific animal measurements and the second is the ability to measure specific (known) individual animals in the population prior to harvest.

The accuracies generated by the program and method and system of the present invention are acceptable for management and research. Certain view orientations are better at producing an accurate estimate of a specific antler or horn characteristic (e.g., inside spread at 0° frontal view compared to 45° view). Although harvest decisions should not be based solely on the results of the new program, the invention can guide the user in making appropriate harvest decisions.

Wildlife professionals require reliable, cost-effective ways to collect useful data. The inventors' research suggests that estimating antler and horn size from photographs is feasible. The ability to collect data on live (un-harvested) deer or animals is an important advantage to wildlife managers and biologists. Estimating characteristics which are used commonly in selective harvest restrictions and which are difficult to estimate visually will help the general hunting public make better management decisions.

The present invention provides wildlife agencies and organizations with an innovative tool to educate the hunting public on visually estimating specific antler and horn characteristics. If used properly and repeatedly, the system and method can hone a hunter's skills at estimating antler and horn size. Education of the hunting public can result in increased support for antler-based, harvest criteria in states looking to manage older, male age classes. Although harvest decisions may not be made exclusively using the program of the present invention, the method and system of the invention can aid in making better management decisions.

The predictive equations of the method and system of the invention use at least one of three (3) specific animal views relative to a camera lens or similar data source input used to estimate antler and horn size. Each of these views is used with novel specific mathematical equations to estimate specific animal characteristics. Calculations are made for three-dimensional estimations by the invention for the frontal view at angle 0°, for the view at angle 45°, and for the view at angle 90°. Predictive equations are used by the invention to transform two-dimensional estimates of antler and horn measurements into three-dimensional values using photographs of animals from the straight-on or zero degree orientation, the angled or 45 degree orientation, and the side or 90 degree orientation.

TABLE 1

Percentage error for estimates of antler characteristics using a single photograph of mounted and live[1] white-tailed deer, ≧2½ years of age, from Mississippi, USA, for the years 2007-2009.

| Antler Characteristic | Angle (°) | Mounted (n = 50) | | Live (n = 37) | |
|---|---|---|---|---|---|
| | | $\bar{x}$ | SE | $\bar{x}$ | SE |
| Inside Spread | 0 | 5.0 | 0.5 | 7.0 | 1.0 |
| | 45 | 7.8 | 0.8 | 9.7 | 1.7 |
| Main Beam Length | 0 | 7.3 | 0.6 | 8.1 | 1.1 |
| | 45 | 6.3 | 0.5 | 10.7 | 1.4 |
| | 90 | 6.4 | 0.5 | 15.6 | 2.2 |
| Tine Length | 0 | 6.5 | 0.5 | 6.7 | 0.6 |
| | 45 | 5.3 | 0.5 | 9.5 | 0.8 |
| | 90 | 7.7 | 0.6 | 10.0 | 1.3 |
| Circumference | 0 | 5.2 | 0.4 | 7.3 | 0.7 |
| | 45 | 5.2 | 0.4 | 8.1 | 0.9 |
| | 90 | 4.9 | 0.4 | 9.1 | 1.1 |
| Abnormal Points[2] | 0 | 17.7 | 2.3 | 19.3 | 5.7 |
| | 45 | 12.9 | 1.7 | 10.8 | 2.8 |
| | 90 | 13.5 | 2.3 | 15.0 | 5.9 |
| Gross Antler Score | 0 | 4.6 | 0.5 | 4.9 | 0.8 |
| | 45 | 3.2 | 0.4 | 5.9 | 1.1 |

[1]Scaled using ear width
[2]n = 12
$\bar{x}$ = Average or mean;
SE = Standard error

TABLE 2

Percentage error for gross antler score estimates using multiple photographs of mounted and live[1] white-tailed deer, ≧2½ years of age, from Mississippi, USA, for the years 2007-2009.

| Angle (°) | Mounted (n = 50) | | Live (n = 20) | |
|---|---|---|---|---|
| | $\bar{x}$ | SE | $\bar{x}$ | SE |
| 0 & 45 | 4.3 | 0.4 | 4.3 | 1.0 |
| 0 & 90 | 3.0 | 0.3 | 4.5 | 1.2 |
| 45 & 90[2] | 2.9 | 0.3 | 5.5 | 1.7 |
| 0, 45, & 90[2] | 2.5 | 0.3 | 4.9 | 1.3 |

[1]Ear and/or eyeball width used for scaling
[2]Live, n = 15
$\bar{x}$ = Average or mean;
SE = Standard error

TABLE 3

Percentage error for gross antler score estimates using a single picture of live white-tailed deer (n = 37), ≧2½ years of age, from Mississippi and Oklahoma, USA, for the years 2007-2009.

| Angle (°) | Anatomical Feature | $\bar{x}$ | SE |
|---|---|---|---|
| 0 | Ear Width | 4.6 | 0.8 |
| | Eye to Eye | 8.2 | 0.9 |
| | Upper Nasal Planum | 12.0 | 1.3 |
| | Lower Nasal Planum | 8.9 | 1.2 |
| 45 | Ear Width | 5.9 | 1.1 |
| | Eyeball | 6.5 | 0.9 |

$\bar{x}$ = Average or mean;
SE = Standard error

TABLE 4

Number of anatomical feature sets (n) measured from male white-tailed deer during the year 2009 in 24 states and Canadian provinces used to obtain regionally accurate estimates of antler features.

| State/Province | n |
|---|---|
| Alabama | 242 |
| Alberta | 35 |
| Arkansas | 51 |
| Connecticut | 29 |
| Florida | 38 |
| Georgia | 37 |
| Illinois | 63 |
| Louisiana | 23 |
| Maine | 38 |
| Maryland | 70 |
| Michigan | 118 |
| Mississippi | 208 |
| Missouri | 17 |
| New Brunswick | 17 |
| New Hampshire | 26 |
| North Carolina | 31 |
| Oklahoma | 40 |
| Pennsylvania | 46 |
| Quebec | 18 |
| South Carolina | 59 |
| Tennessee | 67 |
| Texas | 112 |
| Vermont | 11 |
| West Virginia | 104 |

The above detailed description is presented to enable any person skilled in the art to make and use the invention. Specific details have been revealed to provide a comprehensive understanding of the present invention, and are used for explanation of the information provided. These specific details, however, are not required to practice the invention, as is apparent to one skilled in the art. The claims and specification should not be construed to unduly narrow the complete scope of protection to which the present invention is entitled. Descriptions of specific applications, analyses, and calculations are meant to serve only as representative examples. Various suitable changes, modifications, combinations, and equivalents to the preferred embodiments may be readily apparent to one skilled in the art and the general principles defined herein may be applicable to other embodiments and applications while still remaining within the scope of the invention. There is no intention for the present invention to be limited to the embodiments shown and the invention is to be accorded the widest possible scope consistent with the principles and features disclosed herein.

While various embodiments of the present invention have been described above, it should be understood that they have been presented by way of example and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. Thus, the present invention should not be limited by any of the above-described exemplary embodiments.

Moreover, the method and system of the present invention, like related systems and methods used in the imaging and computer arts are complex in nature, are often best practiced by empirically determining the appropriate values of the operating parameters, or by conducting computer simulations to arrive at best design for a given application. Accordingly, all suitable modifications, combinations, and equivalents should be considered as falling within the spirit and scope of the invention.

It should also be understood that the figures are presented for example purposes only. The present invention is sufficiently flexible and configurable such that it may be utilized in ways other than that shown in the accompanying figures.

References Cited

Baker, R. H. 1984. Origin, classification and distribution. Pages 1-18 in L. K. Halls, editor. White-tailed deer: ecology and management. Stackpole Books, Harrisburg, Pa.

Bergeron, P. 2007. Parallel lasers for remote measurements of morphological traits. Journal of Wildlife Management 71:289-292.

Coe, R. J., R. L. Downing, and B. S. McGinnes. 1980. Sex and age bias in hunter-killed white-tailed deer. The Journal of Wildlife Management 44:245-249.

Demarais, S., K. V. Miller, and H. Jacobson. 2000. White-tailed deer. S. Demarais and P. Krausman, editors. Ecology and management of large mammals in North America. Prentice Hall, Upper Saddle River, N.J.

Demarais, S. and B. K. Strickland. 2011. Antlers. D. G. Hewitt, editor. Biology and management of white-tailed deer.

ESRI Inc. 2006. ArcGIS 9.2. ESRI Inc., Redlands, Calif., USA.

Flinn, J. 2010. Accuracy of estimating age and antler size of photographed deer. Thesis, Mississippi State University.

Gill, J. 1956. Regional differences in size and productivity of deer in West Virginia. Journal of Wildlife Management 20:286-292.

Hastings, K. K., R. J. Small, and L. Hiby. 2001. Use of computer-assisted matching of photographs to examine population parameters of Alaskan harbor seals. Pages 146-160 in *Harbor Seal Investigations in Alaska. Annual Report for NOAA Award NA87FX0300*. 356 pp. Available from Alaska Department of Fish and Game, Division of Wildlife Conservation, 333 Raspberry Road, Anchorage, Ak. 99518.

Heilbrun, R. D., N. J. Silvy, M. E. Tewes, and M. J. Peterson. 2003. Using automatically triggered cameras to individually identify bobcats. Wildlife Society Bulletin 31:748-755.

Hirakawa, H., and K. Maeda 2001. Identifying bats by shadows—Bat inventory using automatic cameras. Scientific Programme and abstracts of 8th International Theriological Congress, Sun City, South Africa: 72-72.

Hirakawa, H., and K. Maeda. 2006. A technique to estimate the approximate size of photographed bats. Wildlife Society Bulletin 34(2):413-418.

Jacobson, H. A., J. C. Kroll, R. W. Browning, B. H. Koerth, and M. H. Conway. 1997. Infrared-triggered cameras for censusing white-tailed deer. Wildlife Society Bulletin 25:547-556.

Kelly, M. J. 2001. Computer-aided photograph matching in studies using individual identification: an example from Serengeti cheetahs. Journal of Mammalogy 82(2):440-449.

McKinley, W. T., S. Demarais, K. L. Gee, and H. A. Jacobson. 2006. Accuracy of the camera technique for estimating white-tailed deer population characteristics. Proceedings, Annual Conference Southeastern Association of Fish and Wildlife Agencies 60:83-88.

Millien, V., S. K. Lyons, L. Olson, F. A. Smith, A. B. Wilson, and Y Yom-Tov. 2006. Ecotypic variation in the context of global climate change: revisiting the rules. Ecology Letters 9:853-869.

Nesbitt and Wright. 2009. Measuring and scoring North American trophies. Third Edition. Boone and Crockett Club, Missoula, Mont.

Richie, W. F. 1970. Regional differences in weight and antler measurements of Illinois deer. Transactions from the Illinois Academy of Science 63:189-197.

Roberts, C. W., B. L. Pierce, A. W. Braden, R. R. Lopez, N. J. Silvy, P. A. Frank, and D. Ransom, Jr. 2006. Comparison of camera and road survey estimates for white-tailed deer. Journal of Wildlife Management 70:263-267.

SAS Institute Inc. 2004. SAS/STAT 9.1 User's guide. Cary, N.C., USA.

Strickland, B. K. and S. Demarais. 2000. Age and regional differences in antlers and mass of white-tailed deer. Journal of Wildlife Management 64:903-911.

Thomas, L. 2010. Deer cameras: the science of scouting. L. Thomas, editor. Quality Deer Management Association, Bogart, Ga.

Wright, P. L., and W. H. Nesbitt. 2003. A Boone and Crockett Club field guide to measuring and judging big game. The Boone and Crockett Club, Missoula, Mont., USA.

What is claimed is:

1. A system using a computer-based device for estimating the three-dimensional antler or horn feature size of an animal, the system comprising:

means for scaling at least one two-dimensional digital photographic image of the animal;

means for measuring anatomical features of the photographed animal wherein the features are relevant to estimating the three-dimensional size of the antler or horn features of the animal;

means for transforming the at least one two-dimensional digital photographic image of the animal into a three-dimensional image estimate of antler or horn feature size using three-dimensional first reference measurements of the measured anatomical features of the animal;

means for calculating the estimated size of the antler or horn features of the animal;

means for calculating a score of an antler or horn size of the animal and assigning a score to the animal; and means for presenting a visual or audible display, or a combination thereof, of data and estimated antler or horn feature size and calculated score of the animal for comparison to data, size, and score for other similar animals.

2. The system of claim 1, wherein the animal is a member of the deer family, taxonomic classification Cervidae.

3. The system of claim 1, wherein the animal is a member of the bovid family, taxonomic classification Bovidae.

4. The system of claim 1, wherein the animal is a member of the pronghorn family, taxonomic classification Antilocapridae.

5. The system of claim 1, wherein the at least one two-dimensional photographic image is an image of the head and antlers, head and horns, or head and pronghorns of the animal.

6. The system of claim 1, wherein the scaling means further comprises a means for comparing data and digital images from multiple source inputs and presenting a display of the compared data and digital images for further analyzing by a user.

7. The system of claim 1, wherein the three-dimensional first reference measurements are based on at least one analyzed animal specimen that represents a normal size variation for each animal species.

8. The system of claim 7, wherein the at least one analyzed animal specimen is a taxidermy-mounted animal specimen.

9. The system of claim 7, further comprising a means for improving the orientation of the animal in the at least one two-dimensional digital photographic image for accurate antler or horn feature size estimation.

10. The system of claim 9, wherein the improving means comprises photographing the analyzed animal specimen from three different image views for obtaining two-dimensional measurements of the animal specimen.

11. The system of claim 10, wherein the three different image views comprise a straight-on frontal view at 0°, an angled view at 45° from the straight-on frontal view, and a side view at 90° from the straight-on frontal view.

12. The system of claim 11, wherein the antler or horn features are selected from the group consisting of inside spread, two main beam lengths, at least one tine length on each antler of the animal, one to four circumferences on each antler, applicable abnormal points, or a combination of two or more thereof.

13. The system of claim 12, further comprising a means for determining the accuracy of each of the antler or horn features using at least one of the three different image views.

14. The system of claim 13, wherein the means for determining antler or horn feature accuracy comprises using at least one analyzed live animal specimen that is based on a live animal to obtain second reference measurements.

15. The system of claim 14, wherein the means for determining antler or horn feature accuracy further comprises comparing the three-dimensional first reference measurements with the second reference measurements.

16. The system of claim 12, further comprising a means for determining the image view that provides the most accurate two-dimensional measurements of antler or horn features.

17. The system of claim 12, wherein a numerical value is assigned to each antler or horn feature for each image view.

18. The system of claim 17, wherein the inside spread value at the side view is estimated using the nearest main beam length value and inside spread value based on at least one known-score mounted antler or horn side view image.

19. The system of claim 11, further comprising a means for transforming the at least one two-dimensional digital photographic image into a three-dimensional image estimate of antler or horn feature size using photographs from at least one of the three different image views.

20. The system of claim 11, wherein the at least one analyzed animal specimen is a live animal.

21. The system of claim 10, wherein the improving means further comprises establishing a spatial scale for each photograph of the animal specimen with a known-size spherical object.

22. The system of claim 21, wherein establishing a spatial scale is by geo-referencing the known-size spherical object using an X coordinate and a Y coordinate to scale and estimate the antler or horn feature size of the animal.

23. The system of claim 22, wherein the three-dimensional image estimate is calculated using corresponding two-dimensional animal specimen measurements from the at least one two-dimensional photographic image and the three-dimensional first reference measurements.

24. The system of claim 23, further comprising a means for estimating the feature size of an antler or horn of an animal not visible in the two-dimensional image by using the estimated size of an opposing antler or horn of the animal.

25. The system of claim 1, wherein the at least one two-dimensional digital photographic image is scaled based on average values of anatomical features for a species of animal, subspecies of animal, or a combination thereof, for a particular geographic region of the animal, and for the gender and age of the animal.

26. The system of claim 1, wherein the means for scaling further comprises using estimated measurements of the anatomical features of the animal.

27. The system of claim 26, wherein the anatomical features of the animal comprise eyeball width, ear width, eye-to-eye width, upper nasal planum width, and lower nasal planum width.

28. The system of claim 27, wherein the eyeball width anatomical feature estimated measurement is the measurement of the diameter of the actual eyeball without the socket.

29. The system of claim 27, wherein the ear width anatomical feature estimated measurement is the measurement of the widest portion of the ear perpendicular to the axis of the ear.

30. The system of claim 27, wherein the eye-to-eye width anatomical feature estimated measurement is the measurement using a frontal view of the animal's head at 0° angle to the camera lens; with both eyes clearly visible in the picture, and wherein the eye-to-eye width measurement is the distance between the interior edge of one eyeball at the location of the pre-orbital gland to the interior edge of the other opposing eyeball.

31. The system of claim 27, wherein the upper nasal planum width anatomical feature estimated measurement is the measurement at the widest part of the nasal planum.

32. The system of claim 27, wherein the lower nasal planum width anatomical feature estimated measurement is the measurement at the widest point of the nasal planum perpendicular to the philtrum.

33. The system of claim 1, wherein the means for scaling, means for measuring, means for transforming, means for calculating feature size, means for calculating and assigning a score, and means for presenting are accomplished by and each process of the system is executed using a computer processor-based device.

34. A non-transitory computer-readable medium comprised of computer processor-based instructions that utilize the system of claim 1 to instruct a computer-based device for estimating and scoring the three-dimensional antler or horn feature size of an animal.

35. A method using a computer-based device for estimating the three-dimensional antler or horn feature size of an animal, the method comprising:
 scaling at least one two-dimensional digital photographic image of the animal;
 estimating anatomical features of the animal wherein the features are relevant to estimating the three-dimensional antler or horn feature size of the animal;

transforming the at least one two-dimensional digital photographic image of the animal into a three-dimensional image estimate of antler or horn feature size using three-dimensional first reference measurements of the estimated anatomical features of the animal;

calculating the estimated antler or horn feature size of the animal;

calculating a score of an antler or horn size of the animal and assigning a score to the animal; and presenting a visual or audible display, or a combination thereof, of data and estimated antler or horn feature size and calculated score of the animal for comparison to data, size, and score for other similar animals.

36. The method of claim 35, wherein the animal is a member of the deer family, taxonomic classification Cervidae.

37. The method of claim 35, wherein the animal is a member of the bovid family, taxonomic classification Bovidae.

38. The method of claim 35, wherein the animal is a member of the pronghorn family, taxonomic classification Antilocapridae.

39. The method of claim 35, wherein the at least one two-dimensional photographic image is an image of the head and antlers, head and horns, or head and pronghorns of the animal.

40. The method of claim 35, wherein the scaling further comprises comparing data and digital images from multiple source inputs and presenting a display of the compared data and digital images for further analyzing by a user.

41. The method of claim 35, wherein the three-dimensional first reference measurements are based on at least one analyzed animal specimen that represents a normal size variation for each animal species.

42. The method of claim 41, wherein the at least one analyzed animal specimen is a taxidermy-mounted animal specimen.

43. The method of claim 41, further comprising improving the orientation of the animal in the at least one two-dimensional digital photographic image for accurate antler or horn feature size estimation.

44. The method of claim 43, wherein the improving the orientation comprises photographing the analyzed animal specimen from three different image views for obtaining two-dimensional measurements of the animal specimen.

45. The method of claim 44, wherein the three different image views comprise a straight-on frontal view at 0°, an angled view at 45° from the straight-on frontal view, and a side view at 90° from the straight-on frontal view.

46. The method of claim 45, wherein the antler or horn features are selected from the group consisting of inside spread, two main beam lengths, at least one tine length on each antler of the animal, one to four circumferences on each antler, applicable abnormal points, or a combination of two or more thereof.

47. The method of claim 46, further comprising determining the accuracy of each of the antler or horn features using at least one of the three different image views.

48. The method of claim 47, wherein the determining antler or horn feature accuracy comprises using at least one analyzed live animal specimen that is based on a live animal to obtain second reference measurements.

49. The method of claim 48, wherein the determining antler or horn feature accuracy further comprises comparing the three-dimensional first reference measurements with the second reference measurements.

50. The method of claim 45, further comprising determining the image view that provides the most accurate two-dimensional measurements of antler or horn features.

51. The method of claim 45, wherein a numerical value is assigned to each antler or horn feature for each image view.

52. The method of claim 51, wherein the inside spread value at the side view is estimated using the nearest main beam length value and inside spread value based on at least one known-score mounted antler or horn side view image.

53. The method of claim 45, further comprising transforming the at least one two-dimensional digital photographic image into a three-dimensional image estimate of antler or horn feature size using photographs from at least one of the three different image views.

54. The method of claim 45, wherein the at least one analyzed animal specimen is a live animal.

55. The method of claim 44, wherein the improving the orientation further comprises establishing a spatial scale for each photograph of the animal specimen with a known-size spherical object.

56. The method of claim 55, wherein establishing a spatial scale is by geo-referencing the known-size spherical object using an X coordinate and a Y coordinate to scale and estimate the antler or horn feature size of the animal.

57. The method of claim 56, wherein the three-dimensional image estimate is calculated using corresponding two-dimensional animal specimen measurements from the at least one two-dimensional photographic image and the three-dimensional first reference measurements.

58. The method of claim 57, further comprising estimating the feature size of an antler or horn of an animal not visible in the two-dimensional image by using the estimated size of an opposing antler or horn of the animal.

59. The method of claim 35, wherein the at least one two-dimensional digital photographic image is scaled based on average values of anatomical features for a species of animal, subspecies of animal, or a combination thereof, for a particular geographic region of the animal, and for the gender and age of the animal.

60. The method of claim 35, wherein the scaling the image further comprises using estimated measurements of the anatomical features of the animal.

61. The method of claim 60, wherein the anatomical features of the animal comprise eyeball width, ear width, eye-to-eye width, upper nasal planum width, and lower nasal planum width.

62. The method of claim 61, wherein the eyeball width anatomical feature estimated measurement is the measurement of the diameter of the actual eyeball without the socket.

63. The method of claim 61, wherein the ear width anatomical feature estimated measurement is the measurement of the widest portion of the ear perpendicular to the axis of the ear.

64. The method of claim 61, wherein the eye-to-eye width anatomical feature estimated measurement is the measurement using a frontal view of the animal's head at 0° angle to the camera lens, with both eyes clearly visible in the picture, and wherein the eye-to-eye width measurement is the distance between the interior edge of one eyeball at the location of the pre-orbital gland to the interior edge of the other opposing eyeball.

65. The method of claim 61, wherein the upper nasal planum width anatomical feature estimated measurement is the measurement at the widest part of the nasal planum.

66. The method of claim 61, wherein the lower nasal planum width anatomical feature estimated measurement is the measurement at the widest point of the nasal planum perpendicular to the philtrum.

67. The method of claim 35, wherein the scaling, measuring, transforming, calculating feature size, calculating and assigning a score, presenting are accomplished by and each process of the system is executed using a computer processor-based device.

68. A non-transitory computer-readable medium comprised of computer processor-based instructions that utilize the method of claim 35 to instruct a computer-based device for estimating and scoring the three-dimensional antler or horn feature size of an animal.

* * * * *